United States Patent
Carlson et al.

(10) Patent No.: US 11,709,534 B2
(45) Date of Patent: *Jul. 25, 2023

(54) METHOD AND APPARATUS FOR MANAGING GLOBAL CHIP POWER ON A MULTICORE SYSTEM ON CHIP

(71) Applicant: MARVELL ASIA PTE, LTD., Singapore (SG)

(72) Inventors: David A. Carlson, Haslet, TX (US); Richard E. Kessler, Northborough, MA (US)

(73) Assignee: MARVELL ASIA PTE, LTD., Singapore (SG)

( * ) Notice: Subject to any disclaimer, the term of this patent is extended or adjusted under 35 U.S.C. 154(b) by 319 days.

This patent is subject to a terminal disclaimer.

(21) Appl. No.: 17/202,557

(22) Filed: Mar. 16, 2021

(65) Prior Publication Data

US 2021/0200287 A1 Jul. 1, 2021

Related U.S. Application Data

(63) Continuation of application No. 16/895,438, filed on Jun. 8, 2020, now Pat. No. 10,983,576, which is a
(Continued)

(51) Int. Cl.
*G06F 1/26* (2006.01)
*G06F 1/3234* (2019.01)
(Continued)

(52) U.S. Cl.
CPC .............. *G06F 1/26* (2013.01); *G06F 1/28* (2013.01); *G06F 1/324* (2013.01); *G06F 1/3243* (2013.01);
(Continued)

(58) Field of Classification Search
CPC ... G05F 3/262; G05F 1/26; G05F 1/28; G05F 1/324; G05F 1/3243; H04B 17/20;
(Continued)

(56) References Cited

U.S. PATENT DOCUMENTS 6,205,555 B1    3/2001   Kageshima et al.
6,363,490 B1    3/2002   Senyk
(Continued)

FOREIGN PATENT DOCUMENTS

CN       1344389      4/2002
CN       1434934      8/2003
(Continued)

OTHER PUBLICATIONS

Duarte, D. et al., "Temperature Sensor Design in a High Volume Manufacturing 65nm CMOS Digital Process", Custom Integrated Circuits Conference, 2007, IEEE, Piscataway, NJ, USA pp. 221-224, XP031223578, Sep. 16, 2007.
(Continued)

*Primary Examiner* — Terrell S Johnson
(74) *Attorney, Agent, or Firm* — Hamilton, Brook, Smith & Reynolds, P.C.

(57) ABSTRACT

According to at least one example embodiment, a method and corresponding apparatus for controlling power in a multi-core processor chip include: accumulating, at a controller within the multi-core processor chip, one or more power estimates associated with multiple core processors within the multi-core processor chip. A global power threshold is determined based on a cumulative power estimate, the cumulative power estimate being determined based at least in part on the one or more power estimates accumulated. The controller causes power consumption at each of the core processors to be controlled based on the determined global power threshold. The controller may directly control power
(Continued)

consumption at the core processors or may command the core processors to do so.

40 Claims, 6 Drawing Sheets

Related U.S. Application Data continuation of application No. 16/210,987, filed on Dec. 5, 2018, now Pat. No. 10,732,684, which is a continuation of application No. 15/499,531, filed on Apr. 27, 2017, now Pat. No. 10,152,102, which is a continuation of application No. 14/038,549, filed on Sep. 26, 2013, now Pat. No. 9,671,844.

(51) Int. Cl.
*G06F 1/28* (2006.01)
*G06F 1/324* (2019.01)
*H04L 27/00* (2006.01)
*H04B 17/20* (2015.01)

(52) U.S. Cl.
CPC ...... *H04B 17/20* (2015.01); *H04L 2027/0016* (2013.01); *H04L 2027/0067* (2013.01); *H04L 2027/0075* (2013.01); *Y02D 10/00* (2018.01)

(58) Field of Classification Search
CPC .. Y02D 10/00; G06F 1/26; G06F 1/28; G06F 1/324; G06F 1/3243
See application file for complete search history.

(56) References Cited

U.S. PATENT DOCUMENTS

| | | | |
|---|---|---|---|
| 6,564,328 B1 | 5/2003 | Grochowski et al. | |
| 7,086,058 B2 | 8/2006 | Luick | |
| 7,231,474 B1 | 6/2007 | Helms et al. | |
| 7,516,334 B2 | 4/2009 | Suzuoki et al. | |
| 7,761,723 B2 | 7/2010 | Greiner et al. | |
| 8,001,394 B2 | 8/2011 | Bose et al. | |
| 8,037,893 B2 | 10/2011 | Aguillar et al. | |
| 8,117,478 B2 | 2/2012 | Liu et al. | |
| 8,122,265 B2 | 2/2012 | Radhakrishnan et al. | |
| 8,356,194 B2 | 1/2013 | Carlson et al. | |
| 8,402,290 B2* | 3/2013 | Finkelstein ............ G06F 1/3203 713/340 | |
| 8,595,527 B2* | 11/2013 | Chung .................. G06F 1/3203 713/600 | |
| 8,868,949 B2 | 10/2014 | Carlson et al. | |
| 9,671,844 B2 | 6/2017 | Carlson et al. | |
| 9,703,351 B2 | 6/2017 | Carlson et al. | |
| 10,152,102 B2 | 12/2018 | Carlson et al. | |
| 10,732,684 B2* | 8/2020 | Carlson ..................... G06F 1/28 | |
| 10,983,576 B2* | 4/2021 | Carlson .................. G06F 1/324 | |
| 2003/0229662 A1 | 12/2003 | Luick | |
| 2005/0040810 A1 | 2/2005 | Poirier et al. | |
| 2005/0120254 A1 | 6/2005 | Suzuoki et al. | |
| 2006/0149974 A1 | 7/2006 | Rotem et al. | |
| 2006/0288241 A1 | 12/2006 | Felter et al. | |
| 2007/0124622 A1 | 5/2007 | Johns et al. | |
| 2007/0143763 A1 | 6/2007 | Adachi | |
| 2007/0198863 A1 | 8/2007 | Bose et al. | |
| 2007/0260894 A1 | 11/2007 | Aguilar et al. | |
| 2008/0028244 A1 | 1/2008 | Capps et al. | |
| 2009/0077407 A1 | 3/2009 | Akimoto | |
| 2009/0171646 A1* | 7/2009 | Silbermintz ........ G06F 11/3616 703/21 | |
| 2009/0177907 A1 | 7/2009 | Sotomayor et al. | |
| 2009/0282377 A1* | 11/2009 | Tamiya ............... G06F 30/3312 716/109 | |
| 2010/0115304 A1 | 5/2010 | Finkelstein et al. | |
| 2010/0205464 A1 | 8/2010 | Rotem et al. | |
| 2012/0017104 A1 | 1/2012 | Siba et al. | |
| 2013/0104130 A1 | 4/2013 | Carlson et al. | |
| 2014/0189413 A1* | 7/2014 | Hasenplaugh ........ G06F 1/3206 713/340 | |
| 2015/0012764 A1 | 1/2015 | Carlson et al. | |
| 2015/0089251 A1 | 3/2015 | Carlson et al. | |
| 2017/0228007 A1 | 8/2017 | Carlson et al. | |
| 2019/0107874 A1 | 4/2019 | Carlson et al. | |
| 2020/0301491 A1 | 9/2020 | Carlson et al. | |

FOREIGN PATENT DOCUMENTS

| | | |
|---|---|---|
| CN | 101030095 | 9/2007 |
| CN | 101923383 | 12/2010 |
| CN | 102652296 | 8/2012 |
| CN | 103282853 | 9/2013 |
| JP | S5887611 | 5/1983 |
| JP | 2S5887611 | 2/1995 |
| JP | 07-044408 A | 2/1995 |
| JP | 10091268 | 4/1998 |
| JP | 2005295768 | 10/2005 |
| JP | 2007122657 | 5/2007 |
| JP | 2007233782 | 9/2007 |
| JP | 2008004094 | 1/2008 |
| JP | 2009031689 | 2/2009 |
| JP | 2009070328 | 2/2009 |
| JP | 2009129137 | 6/2009 |
| KR | 1020020062986 | 11/2000 |
| KR | 1020020008110 | 1/2002 |
| WO | WO0148584 | 7/2001 |
| WO | WO03036449 | 5/2003 |
| WO | WO2004102623 | 11/2004 |
| WO | WO2006037119 | 4/2006 |
| WO | WO2009088451 | 7/2009 |
| WO | WO2011094148 | 8/2011 |
| WO | WO2012075223 | 6/2012 |

OTHER PUBLICATIONS

Kalla, Ron, et al., "Power 7: IBM's Next-Generation Server Processor," published by the IEEE Computer Society, pp. 15 (Mar./Apr. 2010).

Press Release: Cavium Networks Announces Breakthrough Next Generation OCTEON™ II Multi-core MIPS64® internet Application Processor Family with 1 to 32 Cores (Apr. 14, 2009), 2 pgs.

* cited by examiner

METHOD AND APPARATUS FOR MANAGING GLOBAL CHIP POWER ON A MULTICORE SYSTEM ON CHIP

RELATED APPLICATIONS

This application is a continuation of U.S. application Ser. No. 16/895,438, filed Jun. 8, 2020, now U.S. Pat. No. 10,983,576, which is a continuation of U.S. application Ser. No. 16/210,987, filed Dec. 5, 2018, now U.S. Pat. No. 10,732,684, which is a continuation of U.S. application Ser. No. 15/499,531, filed Apr. 27, 2017, now U.S. Pat. No. 10,152,102, which is a continuation of U.S. application Ser. No. 14/038,549, filed Sep. 26, 2013, now U.S. Pat. No. 9,671,844. The entire teachings of the above applications are incorporated herein by reference.

BACKGROUND

Power consumption within computer processors is usually controlled in a way to avoid overheating of the processor or the corresponding chip. In other words, by controlling the power consumption within the processor, the corresponding temperature is also kept under control.

SUMMARY

Power management in multi-core processor devices is typically performed locally at each core processor. In order to improve performance and enhance efficiency, there is need for a capability to manage global chip power on such devices.

According to at least one example embodiment, a global power management approach for controlling power consumption in a multi-core processor chip includes accumulating, at a controller within the multi-core processor chip, one or more power estimates associated with multiple core processors within the multi-core processor chip. A global power threshold is determined based on a cumulative power estimate, the cumulative power estimate being determined based at least in part on the one or more power estimates accumulated. The controller causes power consumption at each of the multiple core processors to be controlled based on the determined global power threshold.

In accumulating the one or more power estimates, the controller may receive a single value indicative of the cumulative power estimate representing the total power consumption by the multiple core processors. The multiple core processors may be coupled to each other in a way to form a serial configuration, where, at each core processor, the local power consumption estimate is added to a value representing the cumulative power estimate and forwarded to the next core processor. At the last core processor, the final value of the cumulative power estimate is forwarded to the controller. Alternatively, the multiple core processors may be coupled in a way to form more than one serial configuration, in which case the controller receives more than one power estimate. In yet another example, each core processor may send its local power consumption estimate directly to the controller.

The controller may be configured to send a read command from the controller to at least one core processor of the multiple core processors. The read command may include an indication of a read operation and a payload value. A core processor receiving the read command adds the local power estimate to the payload value and forwards the read command with the updated payload value to a next core processor or to the controller. The payload value represents a cumulative sum of power estimates associated with one or more core processors.

In determining the global power threshold, the controller is configured to increase a parameter value representing the global power threshold upon determining that the cumulative power estimate determined and a corresponding average over time are both smaller than a desired target power, and decrease the parameter value representing the global power threshold upon determining that the cumulative power estimate determined is larger than the desired target power. The desired target power may be a constant set by a user or a manufacturer of the multi-core processor chip. Alternatively, the desired target power may be dynamically set based at least in part on measured temperature values of the multi-core processor chip.

The multi-core processor chip may also include one or more coprocessor blocks. In order to account for the power consumption of the one or more coprocessor blocks, the controller is configured to accumulate one or more representations of clock activities associated with the one or more coprocessor blocks; determine one or more power estimates associated with the one or more coprocessor blocks based at least in part on the one or more representations accumulated, wherein the determining of the cumulative power estimate for the multi-core processor chip being further based on the one or more power estimates associated with the one or more coprocessor blocks. In determining the one or more power estimates associated with the one or more coprocessor blocks, the controller may employ a lookup table, for example, to determine the power consumption associated with each representation of a clock activity. The one or more representations of the clock activities associated with the one or more coprocessor blocks may be formed by counting, at each coprocessor block, clock activity cycles associated with the same coprocessor block and generating a representation of the clock activity associated with the coprocessor block by mapping a predefined number of counted clock activity cycles into a single symbol within the representation of the clock activity associated with the coprocessor block. The representation of the clock activity, associated with the coprocessor block, is then received by the controller.

In causing power consumption at each core processor to be controlled, the controller may control power consumption at the core processors by adjusting a master clock frequency, and therefore affecting the frequencies of clocks associated with the multiple core processors. Alternatively, the controller sends a command to all core processors instructing them to control their local power consumption. Such command may include an indication of the global power threshold. Upon receiving the global power threshold, each core processor compares the global power threshold with a local power threshold to determine a power limit to be used by the core processor.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Typical power management techniques for multi-core processor chips are usually local to a corresponding core processor, and are not performed globally for the multi-core processor chip. When applying power management locally at each core processor, a power consumption budget for the multi-core processor chip is divided by the corresponding number of core processors to compute a power budget for each core processor. Then, each core processor manages its power independently of other core processors based on the computed power budget for each core processor. As such, the dynamic power of a given core processor may be limited. Also, applying power management locally at each core processor may lead to performance degradation. For example, while a first core processor may be using only a small portion of the power budget available to it, a second core processor may need more power than allowed by the computed power budget for each core processor. As such, some tasks may take longer to be performed, when performing power management locally, and may result in consuming more power at the multi-core processor chip. In the following, embodiments of applying global power management at the chip level are described.

Figure 1:
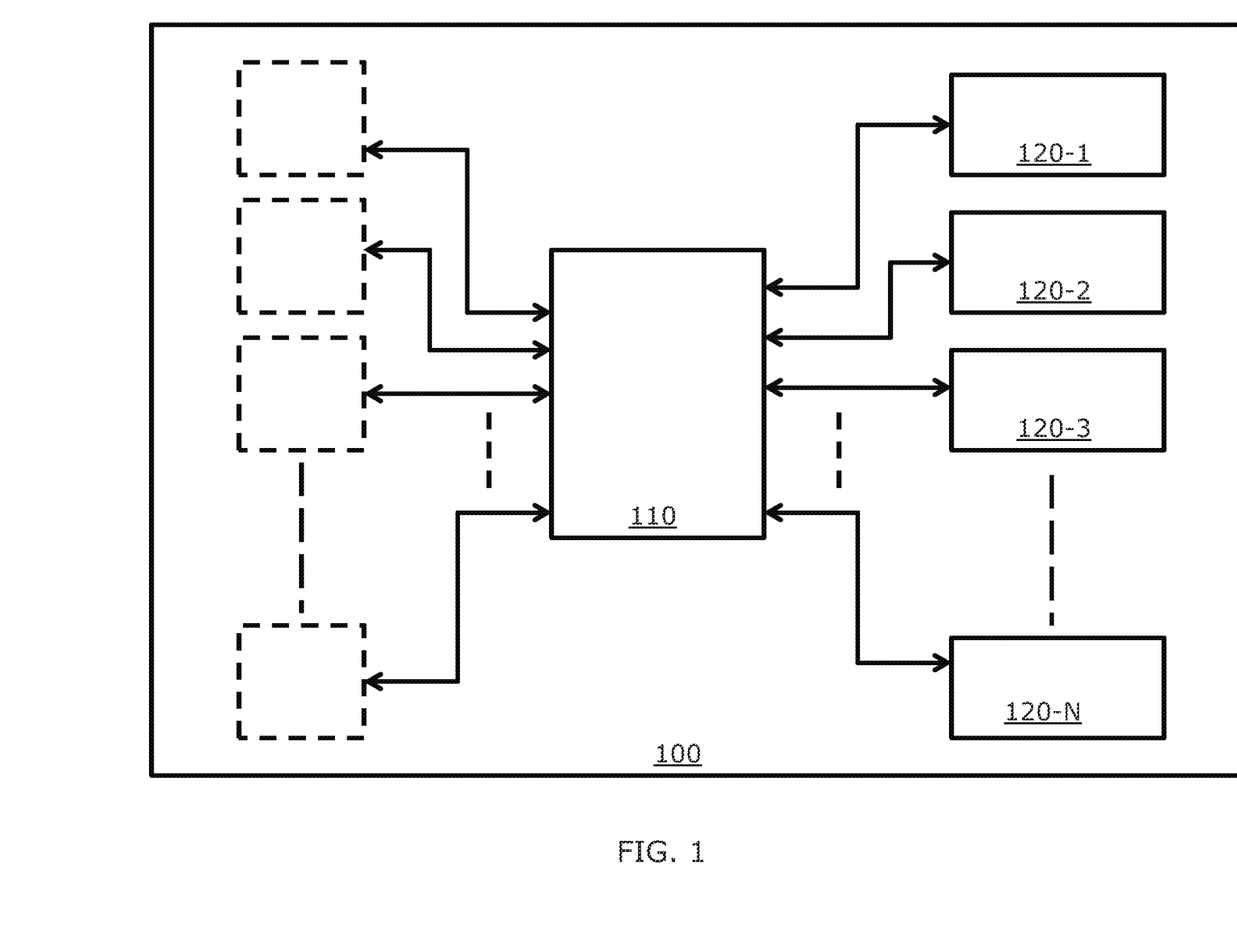
FIG. 1 is a block diagram illustrating a multi-core processor chip according to at least one example embodiment.

FIG. 1 is a block diagram illustrating a multi-core processor chip 100 according to at least one example embodiment. The multi-core processor chip 100 includes multiple core processors, e.g., 120-1-120-N, and a central controller 110. The central controller 110 is configured to manage the global power of the multi-core processor chip 100. The central controller is coupled to the multiple core processors 120-1-120-N and is configured to determine an estimate of global power consumption by the multi-core processor chip 100 over a given time interval. According to at least one aspect, the global power estimate is determined, over a fixed time interval, periodically. In determining the global power estimate, the central controller 110 is configured to record one or more power estimates associated with the multiple core processors, e.g., 120-1-120-N. At each of the multiple core processors, e.g., 120-1-120-N, local power estimation may be performed according to embodiments described in the U.S. Pat. No. 8,356,194, which is incorporated herein in its entirety.

The multi-core processor chip 100 may further include one or more coprocessor blocks, e.g., 130-1-130-M. According to at least one example embodiment, the coprocessor blocks, e.g., 130-1-130-M, are configured to perform input/output (I/O) interfacing operations and/or other operations to supplement the functions of the multiple core processors, e.g., 120-1-120-N. The central controller 110 is configured to take into account power consumed by the coprocessor blocks, e.g., 130-1-130-M, when determining the global power estimate of the multi-core processor chip 100.

Figure 2:
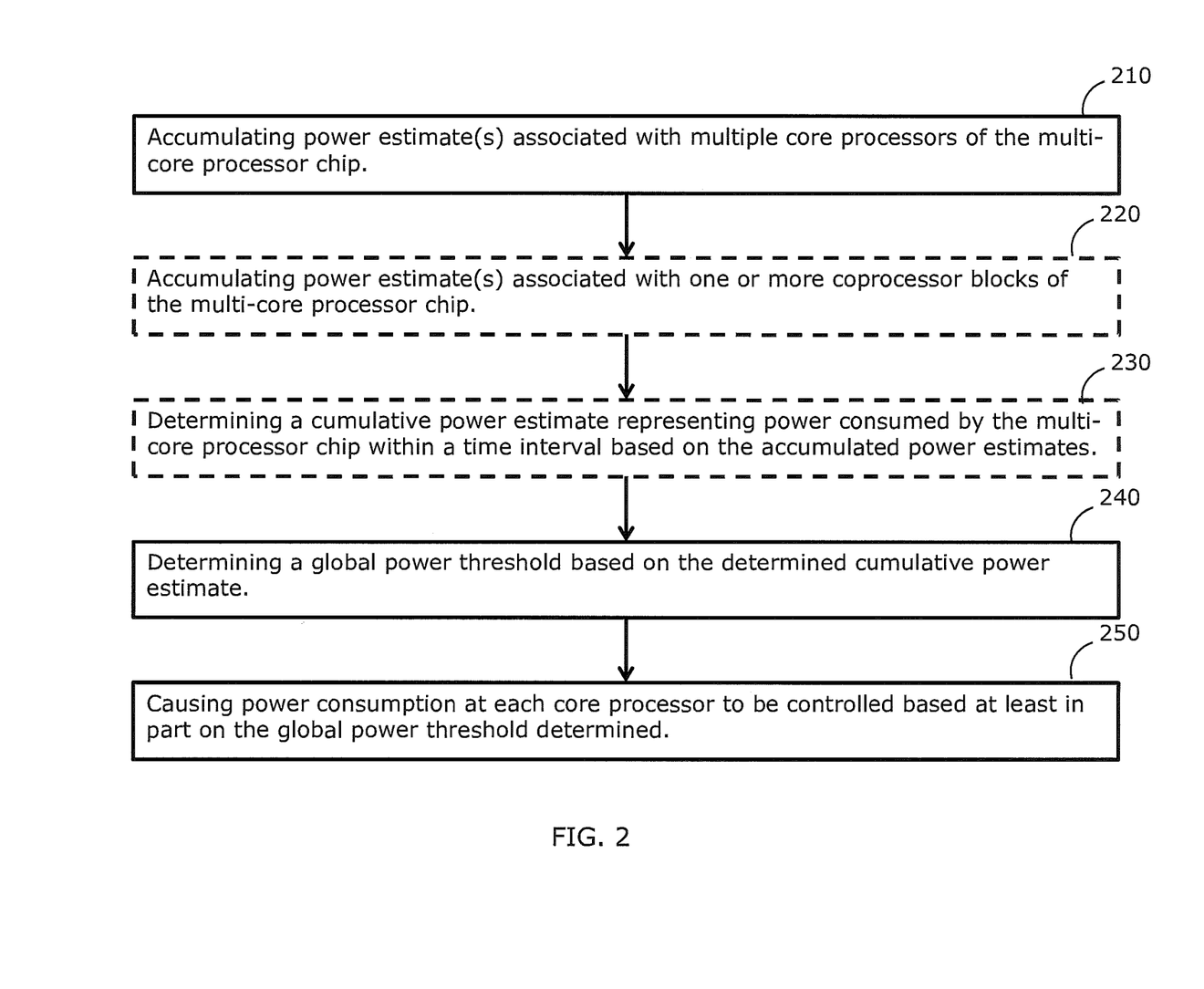
FIG. 2 is a flowchart illustrating a method for controlling power in a multi-core processor chip according to at least one example embodiment.

FIG. 2 is a flowchart illustrating a method for controlling power in the multi-core processor chip 100 according to at least one example embodiment. At block 210, one or more power estimates associated with the multiple core processors, e.g., 120-1-120-N, are accumulated by the central controller 110. The central controller 110 may further accumulate power estimate(s) associated with the one or more coprocessor blocks, e.g., 130-1-130-M, at block 220 if the multi-core processor chip 100 includes such coprocessor blocks.

At block 230, the central controller 110 makes use of the accumulated power estimate(s) to determine an estimate of the cumulative power consumed by the multi-core processor chip 100 over a fixed time interval. For example, the central controller 110 may sum the accumulated power estimates associated with the multiple core processors, e.g., 120-1-120-N, and, if applicable, the accumulated power estimate(s) associated with the one or more coprocessor blocks, e.g., 130-1-130-M. The central controller may alternatively, or additionally, perform other computational processing in determining the cumulative power estimate. The process at block 230 may be optional. For example, the central controller may accumulate a single power estimate indicative of the cumulative power consumed by the multiple core processors, e.g., 120-1-120-N. In such case, the accumulated single power estimate may be used as the cumulative power estimate.

At block 240, a global power threshold is determined by the central controller 110. The global power threshold is determined based on the cumulative power estimate. Besides the cumulative power estimate, a target power value may further be used in determining the global power threshold. The global power threshold represents a global power consumption limit not to be exceeded by any of the core processors over a fixed time interval. The target power value is indicative of a target power consumption level for the multi-core processor chip 100 over the fixed time interval.

According to at least one example implementation, the central controller 110 maintains a cumulative difference parameter and a global power threshold parameter. The cumulative difference parameter, e.g., Cum_Diff, represents a sum or average of differences between determined cumulative power estimates, e.g., Cum_Power_Estimate and target power, e.g., Target_Power. For example, at each time interval, the cumulative difference parameter is updated as:

$$Cum\_Diff = Cum\_Diff + (Cum\_Power\_Estimate - Target\_power).$$

The Cum_Diff parameter is expected to be close to zero if there is sufficient workload to keep the multiple core processors, e.g., 120-1-120-N, busy for a given time interval. If there is insufficient workload for time period, the Cum_Diff parameter becomes negative until it reaches a negative minimum at which the parameter saturates. The negative minimum value, or saturation value, may be defined based on a thermal constant indicating, for example, that the multi-core processor chip 100 has been idle for the last few milli-seconds. In other words, the saturation value enables the multi-core processor chip 100 to memorize only its short and relevant history. Alternatively, the cumulative power difference may be defined as a weighted sum.

The global power threshold parameter, e.g., Global_lim, may be updated at each time interval as:

Global_lim=Global_lim+1 if
(Cum_Power_Estimate<Target_Power) and
(Cum_Diff<0), and Global_lim=Global_lim−1 if
(Cum_Power_Estimate>Target_Power).

That is, the global power threshold is incremented only if the cumulative power estimate is less than the target power and the cumulative difference is less than zero. Also, the global power threshold is decremented only if the cumulative power estimate is greater than the target power.

According to an example aspect, the target power value may be set as a constant by the manufacturer of the multi-core processor chip 100. Alternatively, the target power value may be settable by the software of the multi-core processor chip 100. According to yet another aspect, the target power may be dynamic, e.g., based on information provided by temperature sensors. For example, the target power may change based on the recorded temperature of the multi-core processor chip 100.

Once the global power threshold, e.g., Global_lim, is determined for a particular time interval, the central controller 110 is configured to cause at least one core processor to reduce or increase its power consumption. According to an example embodiment, the central controller 110 may send a command to all core processors, e.g., 120-1-120N, instructing the core processors to control their corresponding power consumption. For example, the central controller 110 may send the determined global power threshold, e.g., Global_lim, to all the core processors, e.g., 120-1-120-N. Each core processor maintains a local power limit value, e.g., Power_lim. Alternatively, the central controller 110 may send a value representing an increment, or decrement, to be applied to a previous global power threshold. At each core processor, the minimum of the global power threshold and the local power limit is used as an upper limit for power consumption in at least the next time interval. According to yet another example embodiment, the central controller 110 may directly reduce, or increase, power consumption at the multiple core processors, e.g., 120-1-120-N. For example, the central controller may adjust the frequency of a master clock resulting in adjustment of the frequency of the clocks of the multiple core processors, e.g., 120-1-120-N.

According to at least one example embodiment, when the determined cumulative power estimate for the multi-core processor chip 100 does not exceed the target power, the central controller 110 sends a signal to the core processors, e.g., 120-1-120-N, indicating that they do not need to throttle themselves, that is to reduce their corresponding frequencies. However, when the determined cumulative power estimate for the multi-core processor chip 100 does exceed the target power and the cumulative difference is zero, the central controller 110 sends a signal to instruct the core processors, e.g., 120-1-120-N, to throttle themselves. Whether instructing the core processors, e.g., 120-1-120-N, to throttle themselves or not, the signal sent may include an indication of a control operation and a payload carrying the global power threshold value. Then, by comparing the global power threshold value to the local power limit, each core processor decides whether or not to perform throttling. In other words, the signal sent may be similar to the signal representing the read command except that the indication of the operation indicates a control operation instead of a read operation and the payload represents the global power threshold value instead of the power estimate value. For example, a read command may be indicated by 0 and the control command may be indicated by 1.

According to another example implementation, two wires may couple the central controller 110 to the core processors, e.g., 120-1-120-N. One wire may be referred to as "throttle_this_interval" wire. This wire is broadcast to all core processors, e.g., 120-1-120-N. The "throttle_this_interval" wire may be broadcast serially to the core processors, e.g., 120-1-120-N. The second wire may be referred to as a "sum" wire. The "sum" wire is sent serially around to each core processor, or to a subset of the multiple core processors, and returns to the central controller 110 after traversing through each core processor. After an idle phase, the first assertion of the "sum" wire indicates that a cumulative power estimate follows within a next number of bits on the wire, LSB first and most significant bit (MSB) last. When a core processor detects that the "sum" wire is on, it knows to add its local power estimate to the cumulative power estimate on the next number of bits. The central controller receives the "sum" wire and appropriately sets the "throttle_this_interval" wire when applicable.

According to at least one example implementation, the accumulation of the power estimate(s) is performed within a half of the fixed time interval, while instructing the core processors to control their corresponding power consumption occurs within the other half of the fixed time interval. For example, if the fixed time interval is equal to 256 clock cycles, accumulating the power estimate(s) by the central controller 110 is performed within 128 clock cycles, and instructing the core processors, e.g., 120-1-120-N, to control their corresponding power consumption takes another 128 clock cycles. Determining the global power threshold by the central controller 110 may be considered as part of accumulating power estimate(s) or part of instructing the core processors, e.g., 120-1-120-N, to control their corresponding power consumptions.

At each of the multiple core processors, e.g., 120-1-120-N, once a signal or command is received with instructions to reduce local power consumption, proper action is taken by the core processor. One way of reducing power consumption is to reduce the local clock frequency. Such approach may be applicable when each core processor has its own phase-locked loop (PLL). Another way of reducing local power consumption at a core processor is to stop issuing instructions. For example, the core processor may keep processing instructions within the fixed time interval until power consumption exceeds the local power limit or the global power threshold received from the central controller 110 and then stops issuing instructions until the end of the fixed time interval.

Figure 3A:
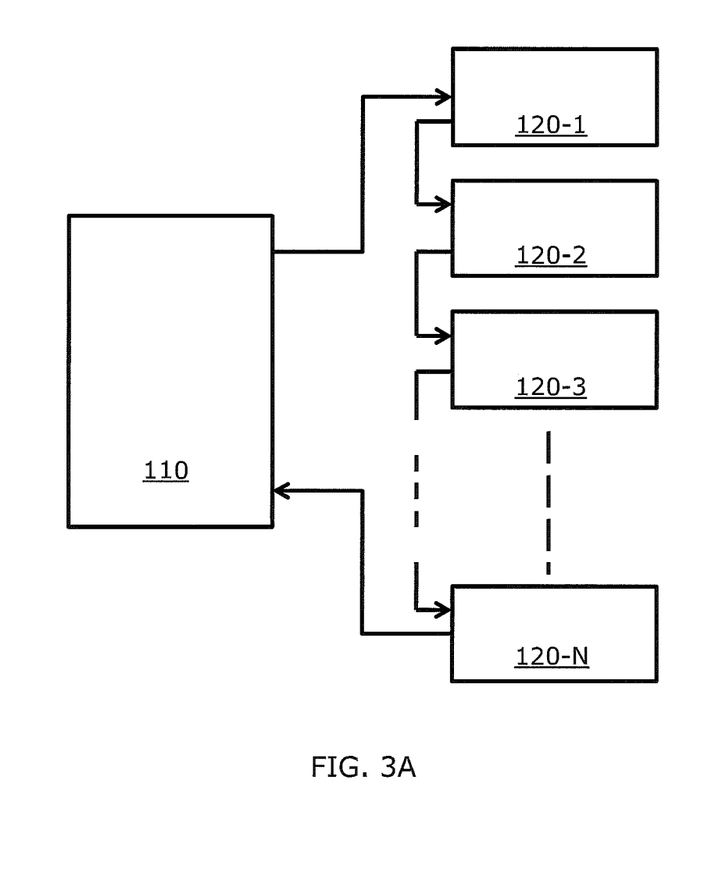
FIGS. 3A and 3B are block diagrams illustrating example serial configurations for accumulating power estimate(s) from the multiple core processors.
Figure 3B:
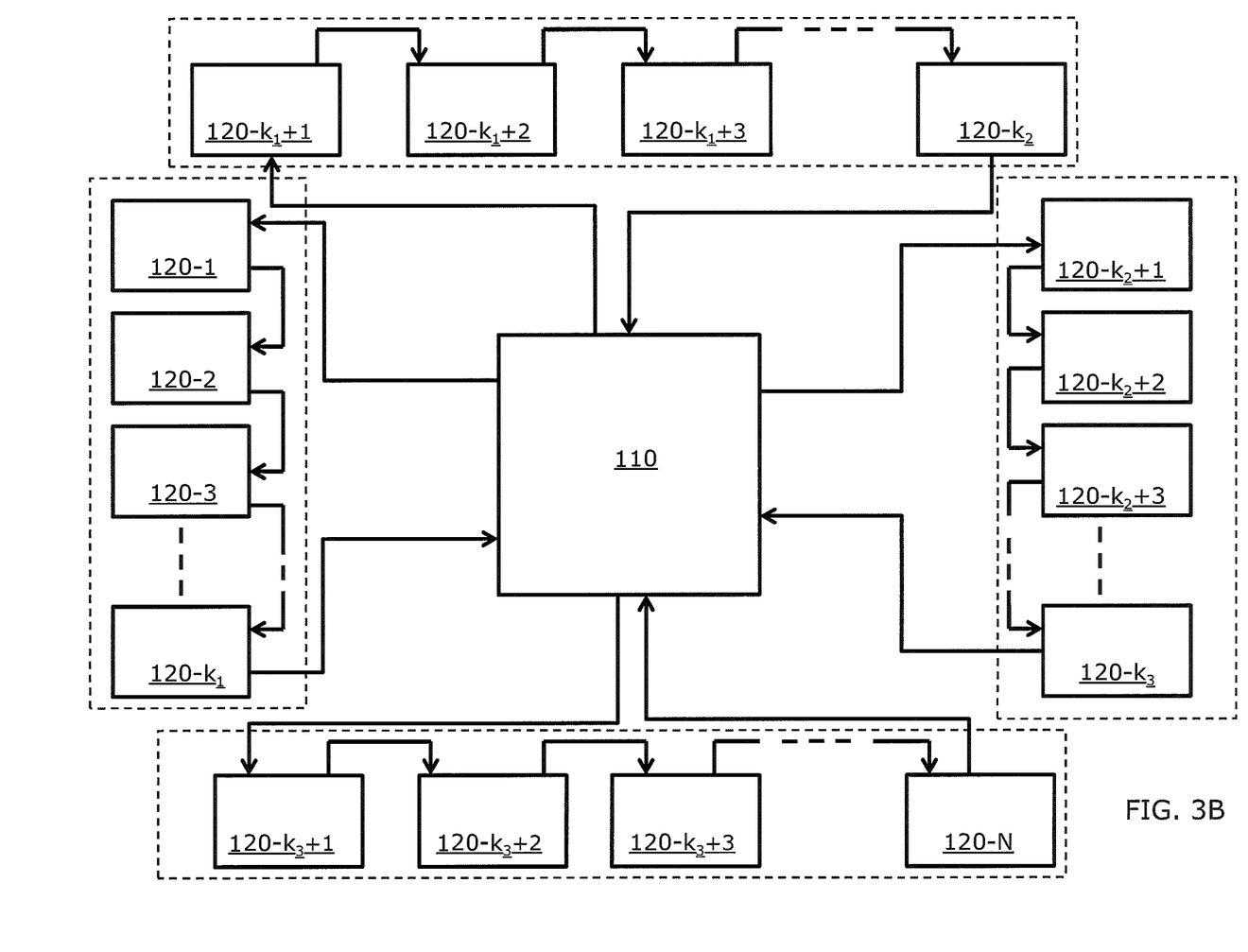

FIGS. 3A and 3B are block diagrams illustrating example serial configurations for accumulating power estimate(s) from the multiple core processors, e.g., 120-1-120-N. FIG. 3A shows a single serial configuration according to which the central controller sends a read command to one of the core processors, e.g., 120-1. According to an example aspect, the read command includes an indication of the read operation and a payload representing a power estimate to be returned to the central controller 110. The first core processor, e.g., 120-1, receives the read command from the central controller 110 and incorporates its estimated power consumption value into the payload of the read command. If the payload initial value is zero, the estimated power consumption value may be incorporated through an addition operation. The read command is then forwarded to the next core processor, e.g., 120-2.

The core processor 120-2 is configured to add its estimated power consumption value to the payload value and forward the read command to the next core processor, e.g., 120-3. The addition of the locally estimated power consumption value and the payload value is repeated at each of the core processors 120-2-120-N. At the last core processor, e.g., 120-N, the final addition result is forwarded to the central controller 110. The value forwarded to the central controller may be used as the cumulative power estimate for all the core processors, e.g., 120-1-120-N, or further computational processing may be applied. The addition operations performed at the core processors may result in a time delay of the arrival of the final result to the central controller 110.

According to an example implementation, such time delay may be reduced by applying addition and forwarding bit by bit. In other words, starting from the least significant bit (LSB), once addition is performed, the carry-over value is saved, while the addition result bit is forwarded. Then, the carry-over value and the next LSBs of the locally estimated consumption power value and the payload value are added. The new carry-over value is saved and the addition result bit is forwarded to the next core processor. At the next core processor, similar operations are performed. That is, as soon as a bit of the payload is received, the corresponding addition is performed and the addition result bit is forwarded to another core processor. As such, the time delay is significantly reduced.

In FIG. 3B, the core processors are arranged into four serial configurations, e.g., 120-1-120-$k_1$, 120-($k_1$+1)-120-$k_2$, 120-($k_2$+1)-120-$k_3$, and 120-($k_3$+1)-120-N. The bit-by-bit addition and forwarding may be applied within each serial configuration. The central controller 110 receives four power estimates, e.g., from the core processors 120-$k_1$, 120-$k_2$, 120-$k_3$, and 120-N. Each of the four power estimates represents a cumulative power estimate for the corresponding serial configuration. In order to compute the cumulative power estimate, the central controller 110, for example, sums the four received power estimates. The central controller 110 may perform other computational processing in determining the cumulative power estimate for all the core processors, e.g., 120-1-120-N.

Figure 4:
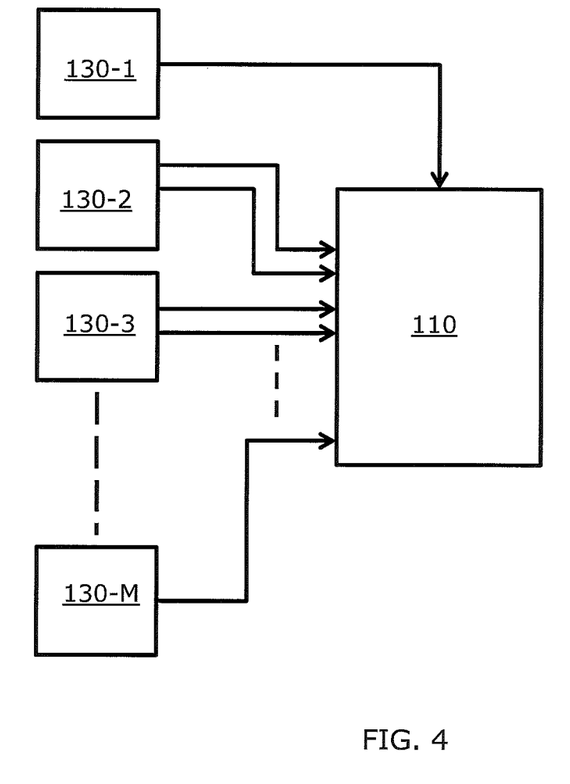
FIG. 4 is a block diagram illustrating a configuration for accumulation power estimates from multiple coprocessor blocks.

FIG. 4 is a block diagram illustrating a configuration for accumulation power estimates from multiple coprocessor blocks, e.g., 130-1-130-M. Within each coprocessor block, most of the power, e.g., about 90 percent, is consumed by the corresponding clock(s). A coprocessor block, e.g., 130-1, 130-2, . . . , or 130-M may have one or more clocks. According to an example embodiment, the central controller 110 receives information from coprocessor blocks, e.g., 130-1-130-M, enabling power consumption estimation for each of the corresponding clocks. For example, the central controller 110 receives a modified clock signal for each clock associated with a coprocessor block. The estimated power consumptions associated with the clocks of the coprocessor blocks, e.g., 130-1-130-M, are summed with the power estimate(s) accumulated from the multiple core processors, e.g., 120-1-120-N, to generate a global cumulative power consumption estimate for the whole multi-core processor chip 100.

Figure 5:
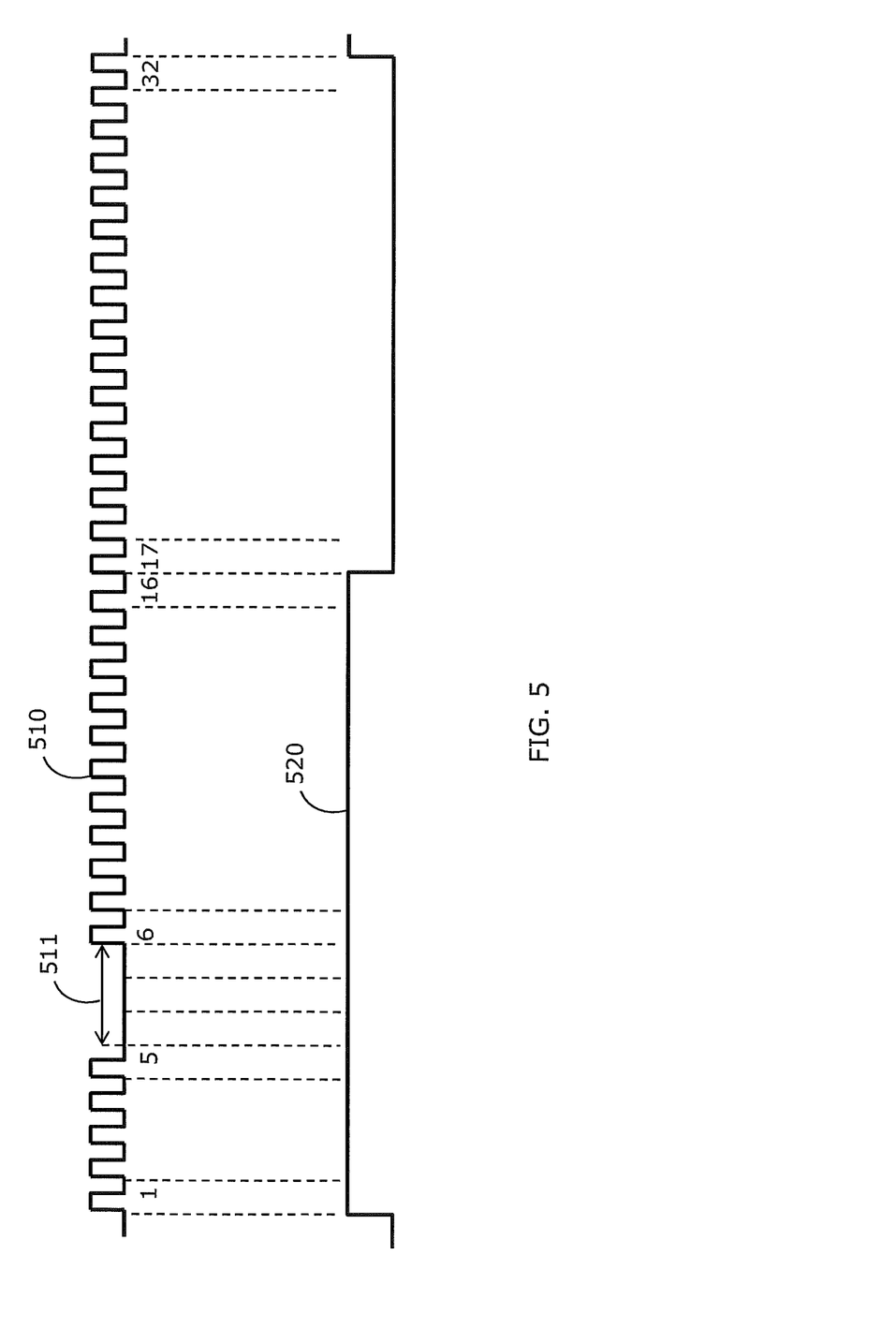
FIG. 5 shows examples of a clock signal associated with a coprocessor block clock and a corresponding modified clock signal, according to at least one example embodiment.

FIG. 5 shows examples of a clock signal 510 associated with a coprocessor block clock and a corresponding modified clock signal 520, according to at least one example embodiment. The modified clock signal 520 is received at the central controller 110 from a coprocessor block, e.g., 130-1, 130-2, . . . , or 130-M. The clock signal 510 typically has a higher frequency than that of the central controller 110. As such, if the clock signal 510 is sent to the central controller 110, the central controller may not properly sample the clock signal 510 in order to estimate the corresponding power. The clock signal 510 may include periods of idleness 511, which makes the different clock signals 510 associated with the coprocessor blocks, e.g., 130-1, 130-2, . . . , or 130-M, asynchronous.

According to an example embodiment, the modified clock signal 520 is generated by reducing a number of clock cycles in the clock signal 510 into a single cycle within the modified clock signal 520. For example, 32 clock cycles in the clock signal 510 correspond to a single cycle in the modified clock signal 520. As such, the central controller 110 is able to properly sample the modified clock signal 520.

Each coprocessor block, e.g., 130-1, 130-2, . . . , or 130-M, is configured to provide a count of the clock activity cycles associated with a clock in the same coprocessor block. Based on the count of clock cycles, a representation of the clock activity, e.g., the modified clock signal 520, is generated by mapping a predefined number, e.g., 32, of counted clock activity cycles into a single symbol within the generated representation of the clock activity. The generated representation is then received by the central controller 110. The central controller 110 may employ a lookup table, for example, to determine the power consumption associated with each generated representation of a clock activity. In determining the cumulative power consumption estimate for the whole multi-core processor chip 100, the central controller 110 may sum accumulated power estimate(s) associated with the multiple core processors, e.g., 120-1-120-N, as well as power estimate(s) corresponding to the coprocessor blocks, e.g., 130-1, 130-2, . . . , or 130-M.

While this invention has been particularly shown and described with references to example embodiments thereof, it will be understood by those skilled in the art that various changes in form and details may be made therein without departing from the scope of the invention encompassed by the appended claims.

What is claimed is:

1. A controller configured to:
   accumulate one or more power estimates associated with multiple core processors based on a configuration, the multiple core processors arranged in the configuration;
   determine a cumulative power estimate based at least in part on the one or more power estimates accumulated;
   determine a global power threshold based on the cumulative power estimate determined; and
   cause power consumption at one or more of the multiple core processors to be controlled based on the global power threshold determined.

2. The controller according to claim 1, wherein, in an event the arrangement is a serial arrangement, the controller is further configured to accumulate the one or more power estimates associated with the multiple core processors based on at least one core processor of the multiple core processors (i) updating a cumulative sum of power estimates to produce an updated cumulative sum and (ii) forwarding the updated cumulative sum to one other core processor or to the controller, the forwarding based on a location of the at least one core processor within the serial configuration.

3. The controller according to claim 2, wherein the controller is further configured to send a read command to the at least one core processor, causing the at least one processor to produce the updated cumulative sum and forward the updated cumulative sum.

4. The controller according to claim 3, wherein, in the arrangement, the at least one core processor is coupled to the controller via a sum wire and wherein the controller is further configured to assert the sum wire to cause the at least one core processor of the multiple core processors to update the cumulative sum.

5. The controller according to claim 1, wherein, in an event the arrangement is a serial arrangement, the controller is further configured to accumulate the one or more power estimates associated with the multiple core processors based on receiving one or more cumulative sums of power estimates associated with one or more subsets of the multiple core processors.

6. The controller according to claim 1, wherein, in an event the multiple core processors are coupled in a manner forming more than one serial configuration in the arrangement, the controller is further configured to accumulate the one or more power estimates based on receiving multiple cumulative power estimates, the multiple cumulative power estimates including a respective cumulative power estimate for each serial configuration of the arrangement.

7. The controller according to claim 1, wherein, in an event each core processor is coupled to the controller in the arrangement, the controller is further configured to accumulate the one or more power estimates based on receiving a respective power consumption estimate sent to the controller, directly, from each core processor of the multiple core processors.

8. The controller according to claim 1, wherein the controller is further configured to:
increase the global power threshold determined in an event the cumulative power estimate determined and a corresponding average of the cumulative power estimate over time are both smaller than a desired target power.

9. The controller according to claim 1, wherein the controller is further configured to:
decrease the global power threshold determined in an event the cumulative power estimate determined is larger than a desired target power.

10. The controller according to claim 1, wherein the multiple core processors are included in a multi-core processor chip, wherein the controller is further configured to determine the global power threshold based on a corresponding average of the cumulative power estimate over time, relative to a desired target power, and wherein the desired target power is a constant set by a user or a manufacturer of the multi-core processor chip.

11. The controller according to claim 1, wherein the multiple core processors are included in a multi-core processor chip, wherein the controller is further configured to determine the global power threshold based on a corresponding average of the cumulative power estimate over time, relative to a desired target power, and wherein the desired target power is dynamically set based at least in part on measured temperature values of the multi-core processor chip.

12. The controller according to claim 1, wherein the multiple core processors are included in a multi-core processor chip, wherein the multi-core processor chip further includes one or more coprocessor blocks, and wherein the controller is further configured to:
accumulate one or more representations of clock activities associated with the one or more coprocessor blocks; and
determine one or more power estimates associated with the one or more coprocessor blocks based at least in part on the one or more representations accumulated,
wherein determining the cumulative power estimate is further based on the one or more power estimates associated with the one or more coprocessor blocks.

13. The controller according to claim 12, wherein, in determining the one or more power estimates associated with the one or more coprocessor blocks, the controller is further configured to check a lookup table to determine the power estimate associated with each coprocessor block.

14. The controller according to claim 12, wherein, in accumulating one or more representations of the clock activities associated with the one or more coprocessor blocks, each coprocessor block is configured to:
count, at each coprocessor block, clock activity cycles associated with the same coprocessor block;
generate a representation of the clock activity associated with the coprocessor block by mapping a predefined number of counted clock activity cycles into a single symbol within the representation of the clock activity associated with the coprocessor block; and
send the representation of the clock activity associated with the coprocessor block to the controller.

15. The controller according to claim 1, wherein, in causing power consumption at each core processor to be controlled, the controller is further configured to instruct each core processor to control power consumption of the core processor based on the global power threshold.

16. The controller according to claim 15, wherein, in instructing each core processor to control power consumption, the controller is further configured to send an indication of the global power threshold determined to each core processor.

17. The controller according to claim 16, wherein each core processor is configured to compare the global power threshold with a local power limit.

18. The controller according to claim 1, wherein the controller is further configured to adjust a master clock frequency to cause power consumption at one or more of the multiple core processors to be controlled.

19. The controller according to claim 1, wherein the controller is further configured to determine the global power threshold based on a corresponding average of the cumulative power estimate over time, relative to a desired target power.

20. A method for controlling power consumption, the method comprising:
accumulating one or more power estimates associated with multiple core processors based on a configuration, the multiple core processors arranged in the configuration;
determining a cumulative power estimate based at least in part on the one or more power estimates accumulated;
determining a global power threshold based on the cumulative power estimate determined; and
causing power consumption at each core processor to be controlled based on the global power threshold determined.

21. The method according to claim 20, wherein, in an event the arrangement is a serial arrangement, the accumulating includes including the one or more power estimates associated with the multiple core processors based on at least one core processor of the multiple core processors (i) updating a cumulative sum of power estimates to produce an updated cumulative sum and (ii) forwarding the updated cumulative sum to one other core processor or to the controller, the forwarding based on a location of the at least one core processor within the serial configuration.

22. The method according to claim 21, further comprising sending a read command from the controller to the at least one core processor, the sending causing the least one core processor to produce the updated cumulative sum and forward the read command with the updated cumulative sum.

23. The method according to claim 22, wherein causing the at least one core processor to update the cumulative sum includes asserting a sum wire, the sum wire coupling the controller to the at least one core processor in the arrangement.

24. The method according to claim 20, wherein, in an event the arrangement is a serial configuration, accumulating the one or more power estimates associated with multiple core processors includes receiving one or more cumulative sums of power estimates associated with one or more subsets of the multiple core processors.

25. The method according to claim 20, wherein, in an event the arrangement is a serial configuration, the accumulating is based on receiving one or more cumulative sums of power estimates associated with one or more subsets of the multiple core processors.

26. The method according to claim 20, wherein, in an event the multiple core processors are coupled in a manner forming more than one serial configuration in the arrangement, the accumulating is based on receiving multiple cumulative power estimates, the multiple cumulative power estimates including a respective cumulative power estimate for each serial configuration of the arrangement.

27. The method according to claim 20, wherein, in an event each core processor is coupled to the controller in the arrangement, the accumulating is based on receiving a respective power consumption estimate sent to the controller, directly, from each core processor of the multiple core processors.

28. The method according to claim 20, wherein determining the global power threshold is further based on a corresponding average of the cumulative power estimate over time, relative to a desired target power, and wherein the method further comprises:
increasing the global power threshold determined in an event the cumulative power estimate determined and the corresponding average over time are both smaller than the desired target power.

29. The method according to claim 20, wherein determining the global power threshold is further based on a corresponding average of the cumulative power estimate over time, relative to a desired target power, and wherein the method further comprises:
decreasing the global power threshold determined in an event the cumulative power estimate determined is larger than the desired target power.

30. The method according to claim 20, wherein the multiple core processors are included in a multi-core processor chip, wherein determining the global power threshold is further based on a corresponding average of the cumulative power estimate over time, relative to a desired target power, and wherein the desired target power is a constant set by a user or a manufacturer of the multi-core processor chip.

31. The method according to claim 20, wherein the multiple core processors are included in a multi-core processor chip, wherein determining the global power threshold is further based on a corresponding average of the cumulative power estimate over time, relative to a desired target power, and wherein the desired target power is dynamically set based at least in part on measured temperature values of the multi-core processor chip.

32. The method according to claim 20, wherein the multiple core processors are included in a multi-core processor chip and wherein the method further comprises:
accumulating one or more representations of clock activities associated with one or more coprocessor blocks within the multi-core processor chip; and
determining one or more power estimates associated with the one or more coprocessor blocks based at least in part on the one or more representations accumulated,
wherein determining the cumulative power estimate is further based on the one or more power estimates associated with the one or more coprocessor blocks.

33. The method according to claim 32, wherein determining the one or more power estimates associated with the one or more coprocessor blocks is further based on a lookup table.

34. The method according to claim 32, wherein accumulating the one or more representations of the clock activities associated with the one or more coprocessor blocks includes:
counting, at each coprocessor block, clock activity cycles associated with the same coprocessor block;
generating a representation of the clock activity associated with the coprocessor block by mapping a predefined number of counted clock activity cycles into a single symbol within the representation of the clock activity associated with the coprocessor block; and
receiving, by the controller, the representation of the clock activity associated with the coprocessor block.

35. The method according to claim 20, wherein causing power consumption at each core processor to be controlled includes instructing each core processor to control power consumption of the core processor based on the global power threshold.

36. The method according to claim 35, wherein instructing each core processor to control power consumption includes sending an indication of the global power threshold determined to each core processor.

37. The method according to claim 36, further comprising comparing, by each core processor, the global power threshold with a local power limit.

38. The method according to claim 20, wherein causing power consumption at each core processor to be controlled includes adjusting a master clock frequency.

39. The method according to claim 20, wherein determining the global power threshold is further based on a corresponding average of the cumulative power estimate over time, relative to a desired target power.

40. An apparatus comprising:
means for accumulating one or more power estimates associated with multiple core processors based on a configuration, the multiple core processors arranged in the configuration;
means for determining a cumulative power estimate based at least in part on the one or more power estimates accumulated;
means for determining a global power threshold based on the cumulative power estimate determined; and
means for causing power consumption at one or more of the multiple core processors to be controlled based on the global power threshold determined.

* * * * *